US007728972B2

(12) United States Patent
Yang

(10) Patent No.: US 7,728,972 B2
(45) Date of Patent: Jun. 1, 2010

(54) LINEAR FIBER ARRAY MOUNT TO A SPECTROMETER

(75) Inventor: Yongwu Yang, Belmont, MA (US)

(73) Assignee: Lambda Solutions, Inc., Waltham, MA (US)

( * ) Notice: Subject to any disclaimer, the term of this patent is extended or adjusted under 35 U.S.C. 154(b) by 42 days.

(21) Appl. No.: 12/063,410

(22) PCT Filed: Aug. 8, 2006

(86) PCT No.: PCT/US2006/030760

§ 371 (c)(1),
(2), (4) Date: Jun. 5, 2008

(87) PCT Pub. No.: WO2007/019460

PCT Pub. Date: Feb. 15, 2007

(65) Prior Publication Data

US 2008/0246962 A1 Oct. 9, 2008

(51) Int. Cl.
*G01J 3/02* (2006.01)
*G02B 6/36* (2006.01)

(52) U.S. Cl. .................................. 356/326; 385/88
(58) Field of Classification Search ................. 356/326, 356/328
See application file for complete search history.

(56) References Cited

U.S. PATENT DOCUMENTS 6,181,418 B1 * 1/2001 Palumbo et al. ............. 356/328

* cited by examiner

*Primary Examiner*—F. L Evans
(74) *Attorney, Agent, or Firm*—Sills, Cummis & Gross P.C.

(57) ABSTRACT

A coupler for coupling a linear fiber array to a spectrometer is provided, the coupler having a tube, a linear fiber bundle array inserted through the tube, an alignment mechanism for aligning the linear fiber bundle array with a slit on the spectrometer, and a locking mechanism for locking the linear fiber bundle array to the tube. Further, a method for coupling a linear fiber array to a spectrometer is provided, the method having the steps of inserting a linear fiber bundle array through a tube, aligning the linear fiber bundle array with a slit on the spectrometer, and locking the linear fiber bundle array to the tube once it is aligned with the slit on the spectrometer.

18 Claims, 5 Drawing Sheets

LINEAR FIBER ARRAY MOUNT TO A SPECTROMETER

BACKGROUND OF THE INVENTION

1. Field of the Invention

The present invention is related to a mount for coupling a linear fiber array to a spectrometer slit.

2. Prior Art

A spectrometer is an optical instrument used to measure properties of light over a specific portion of the electromagnetic spectrum. The variable measured is most often the light's intensity but could also, for instance, be the polarization state. The independent variable is usually the wavelength of the light, normally expressed as some fraction of a meter, but sometimes expressed as some unit directly proportional to the photon energy, such as wavenumber or electron volts, which has a reciprocal relationship to wavelength. A spectrometer is used in spectroscopy for producing spectral lines and measuring their wavelengths and intensities.

A typical spectrometer includes an entrance slit, a collimating mirror or lens, a wavelength dispersive element, such as grating or prism, a mirror or lens for focusing the dispersed light onto a single element detector such as photomultiplier (PMT) or avalanche photodiode. The entrance and exit slits are aligned in parallel to the grating grooves or perpendicular to the dispersion direction of the prism. When a multi-element detector such as diode array or charge coupled device (CCD) is used, the exit slit is removed and the width of the diode or CCD pixel is acting as the exit slit. The slits determine the spectrometer's resolution (subject to the overriding resolving power of the dispersion medium) and have a profound effect on the amount of light that is passed through the spectrometer.

For the remote sampling applications, the signal light from sample under investigation is transmitted through a fiber optic cable with either a single large core fiber or round-to-linear multiple fiber bundle which is butt-coupled onto the entrance slit. When a round-to-linear multiple fiber bundle is used, the linear end of the fiber bundle is aligned along the entrance slit, which is achieved by rotating the ferrule and fixed by a set screw conventionally. In order to achieve better light coupling efficiency, care must be taken to align the linear fiber array to the entrance slit. This manual alignment procedure is tedious and difficult and requires skilled personnel. In addition, the mounting mechanism is not stable at all with a single set screw. Thus it limits its field use. Particularly it requires tedious realignment after each movement.

With this conventional mounting mechanism, light loss occurs at the fiber optic array and entrance slit interface. To facilitate the alignment, the fiber core diameter is generally larger than the slit width. Thus a significant portion of the light from the fiber bundle is blocked by the slit. In some cases, light loss can be as much as 90%. This greatly reduces the system throughput, sensitivity and thus signal-to-noise ratio. This presents a problem for situations like weak signal to begin with. For example, Raman scattering is extremely weak, only very small fraction of the incident light inelastically scattered while almost all of the light is scattered elastically, so called Rayleigh scattering. Therefore in Raman spectroscopy it cannot afford losing any part of the signal.

U.S. Pat. No. 5,042,893 to Ong describes a direct mount coupler for use with a diode array spectrophotometer system. In this design, the entrance slit is replaced by a slit block containing a single waveguide (or plurality of fiber optic waveguides). The waveguide has a linear cross section adjacent the spectrometer and a round cross section at the connector, which secures the signal collection fiber. By removing the slit, the linear fiber array is acting as a slit so misalignment of the fiber slit interface is eliminated. Therefore light loss at the fiber bundle and slit interface is avoided and the system provides better sensitivity. However, it introduces an additional optic component (the single waveguide or plurality of fiber optic waveguides) and an interface at the connector between the round section of the coupler and a signal fiber waveguide. There exists light loss due to fiber-fiber coupling at the connector interface. In addition, a large core fiber has to be used for transferring the signal from a sample to match the diameter of the round section at the connector according to the patent's teaching. As the core diameter of the fiber is getting larger, the fiber is getting stiffer. Therefore the care must be taken to handle it which is inconvenient to the users for routine analysis.

Therefore, there is a need for linear fiber array mount for a spectrometer to provide an efficient coupling of the fiber slit to the entrance slit. Furthermore there is a need for a fiber slit mount for a slitless spectrometer to minimize light loss during the transfer between a sample and detector.

SUMMARY OF THE INVENTION

The present invention satisfies the above-mentioned need by providing a simple and ease-of-use fiber slit mount for efficiently coupling the linear fiber array to the entrance slit of a spectrometer and also providing a mount for a slitless spectrometer that reduces light loss.

A mount according to the invention consists of a directional adapter block to be mounted onto the spectrometer adjacent the entrance slit and a fiber slit array connector that has a direction-lock key and screw cap. The directional adapter block replaces the conventional fiber slit mounting plate that has a hole for fiber slit ferrule and a set screw to tighten the ferrule. Unlike in the prior art, the ferrule instead is inserted into a tube of the connector, and rotated to align the fibers along the slit, and then secured inside the tube at the factory. The connector is then secured to the adapter block by the screw cap. The orientation of the linear fiber array is maintained along the slit by inserting the lock key on the tube into the open slot of the adapter block.

The mount of the present invention provides a simpler mechanism for coupling of the linear fiber array to the spectrometer entrance slit. It ensures the alignment of the fiber slit to the spectrometer entrance slit, minimizes the light loss due to misalignment of the fiber-slit interface of the conventional design, and thus enhanced the system sensitivity and signal to noise ratio. It eliminates the tedious and difficult manual alignment procedure which is necessary in the conventional design whenever the spectrometer is transported. Furthermore, it is also more stable and secure compared to the conventional mounting mechanism. These advantages permit wide field or clinical uses of advanced analytical instruments, such as Raman spectrometer and fluorescence spectrometer.

The mount for the linear fiber array of the present invention provides efficient light coupling of the fiber array for the slitless spectrometer. The entrance slit of the spectrometer is removed and the linear fiber array with appropriate core diameter and numerical aperture (NA) is acting as the entrance slit. The core diameter is determined by the spectrometer resolution. The NA should closely match the acceptance angle of the spectrometer optics to achieve high throughput and in the meantime to reduce stray light.

The polychromatic light under investigation from a sample is guided by a fiber bundle. The fibers at the sample end are arranged in a close-packed format which has a round cross section. The other end is arranged linearly and secured in a ferrule. The number of fibers in the bundle is in general limited by the ratio of the height of the detector to the diameter of fiber cladding/buffer. Preferably the number of the fibers is chosen to fill the detector height. The ferrule is secured inside the tube of the linear fiber slit connector which is then secured to the adapter block.

Since there is not a slit in the spectrometer which may block the light from the fiber, all the light exiting from the fiber enters the spectrometer and no light loss occurs. The light throughput is improved compared to the conventional spectrometer with a slit, so better sensitivity and thus signal-to-noise ratio are achieved. In addition, there is no additional interface between the sample and spectrometer, light loss from a sample is minimized, which results in higher sensitivity. Furthermore, it has other advantages such as reproducible (achieved by the open slot in the adapter and the lock key in the connector) without tedious and difficult manual alignment procedure, stable and ease of use.

Accordingly, the present invention provides a coupler for coupling a linear fiber array to a spectrometer, the coupler comprising a tube, a linear fiber bundle array inserted through the tube, alignment means for aligning the linear fiber bundle array with a slit on the spectrometer, and locking means for locking the linear fiber bundle array to the tube. The alignment means comprises a fiber bundle boot attached to the linear fiber bundle array, the fiber bundle boot also being inserted through the tube.

The coupler further comprises a directional adapter, where the tube and linear fiber bundle array are inserted in the directional adapter. The coupler further comprises a cap that attaches to the directional adapter for securing the tube and linear fiber bundle array in the directional adapter, and a mounting plate for securing the directional adapter to the spectrometer.

The locking means can comprise one or more screws to lock the linear fiber bundle array inside the tube once the linear fiber bundle array is aligned with the slit on the spectrometer, and can comprise one or more screws for locking the alignment means inside the tube once the linear fiber bundle array is aligned with the slit on the spectrometer.

Further, the present invention provides a method for coupling a linear fiber array to a spectrometer, the method comprising (a) inserting a linear fiber bundle array through a tube, (b) aligning the linear fiber bundle array with a slit on the spectrometer, and (c) locking the linear fiber bundle array to the tube once it is aligned with the slit on the spectrometer.

The method for coupling a linear fiber array to a spectrometer further comprises (d) attaching a fiber bundle boot to the linear fiber bundle array before step (a). The method further comprises (e) mounting a directional adapter through a mounting plate to be mounted to the spectrometer. The method further comprises (f) inserting the tube through the directional adapter before step (a). The method further comprises (g) securing a cap to the directional adapter after step (a) and before step (b).

The method for coupling a linear fiber array to a spectrometer further comprises (h) removing the cap from the directional adapter after step (c), (i) locking the tube to the fiber bundle boot after step (h), and (j) securing the cap to a retaining ring on a groove of the tube after step (i).

The present invention further provides a coupler for coupling a linear fiber array to a spectrometer, the coupler comprising a directional adapter inserted through and secured to a center of a mounting plate, the mounting plate secured to a spectrometer, a tube inserted through the directional adapter, a linear fiber bundle array attached to a fiber bundle boot, the linear fiber bundle array and fiber bundle boot inserted through the tube, the fiber bundle boot allowing for alignment of the linear fiber bundle array with a slit on the spectrometer, and locking means for locking the linear fiber bundle array to the tube. The coupler further comprises a second locking means for locking the fiber bundle boot to the tube.

The present invention also provides a method for coupling a linear fiber array to a spectrometer, the method comprising, (a) securing a directional adapter to a mounting plate, (b) securing the mounting plate to a spectrometer, (c) inserting a tube through the directional adapter, (d) attaching a fiber bundle boot to a linear fiber bundle array, (e) inserting the linear fiber bundle array through a tube, (f) aligning the linear fiber bundle array with a slit on the spectrometer using the fiber bundle boot, and (g) locking the linear fiber bundle array to the tube once it is aligned with the slit on the spectrometer. The method further comprises (h) locking the fiber bundle boot to the tube.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE INVENTION

The present invention provides efficient and ease-of-use fiber bundle coupler to the entrance slit of a spectrometer when light waveguide is used to transfer the light from a sample under investigation. The performance of spectrometer system is improved by the precision machined directional opening in the adapter and the lock key in the connector. The slot in the fiber bundle boot facilitates the adjustment of the fiber bundle to align the linear fiber array along the entrance slit.

Figure 1:
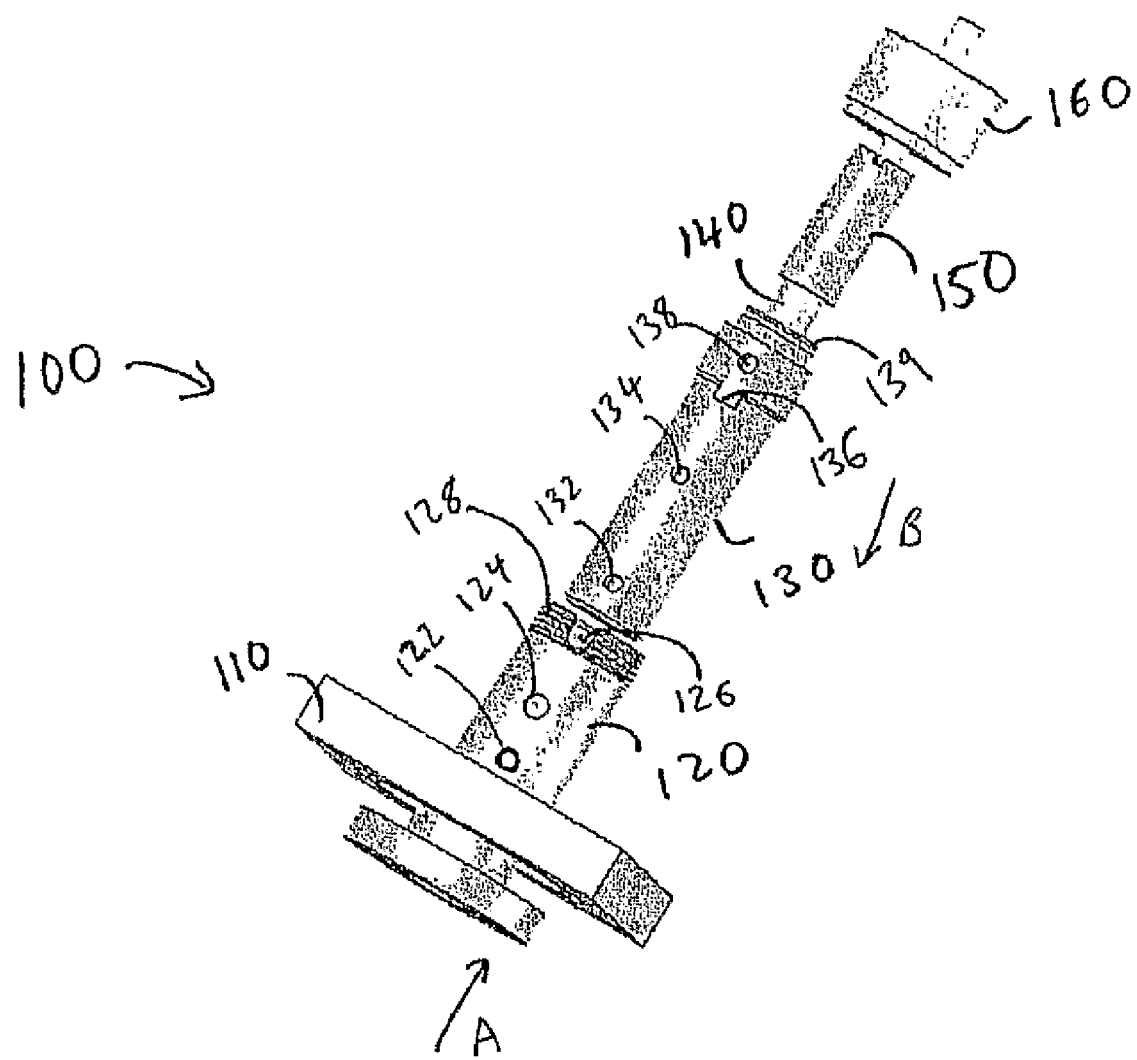
FIG. 1 illustrates an exploded perspective view of the preferred embodiment of the fiber slit mount assembly.

FIG. 1 shows an exploded view of the linear fiber array mount 100 including all the components, including a mounting plate 110, a directional adapter 120, a lock tube 130 of the connector, a fiber bundle array 140, a fiber bundle boot 150 and a cap 160. The directional adapter 120 comprises holes 122, 124, external threads 128, and a slot 126. The lock tube 130 comprises holes 132, 134, notch 136, a hole 138 and a groove 139 for a cap retaining ring.

Figure 2:
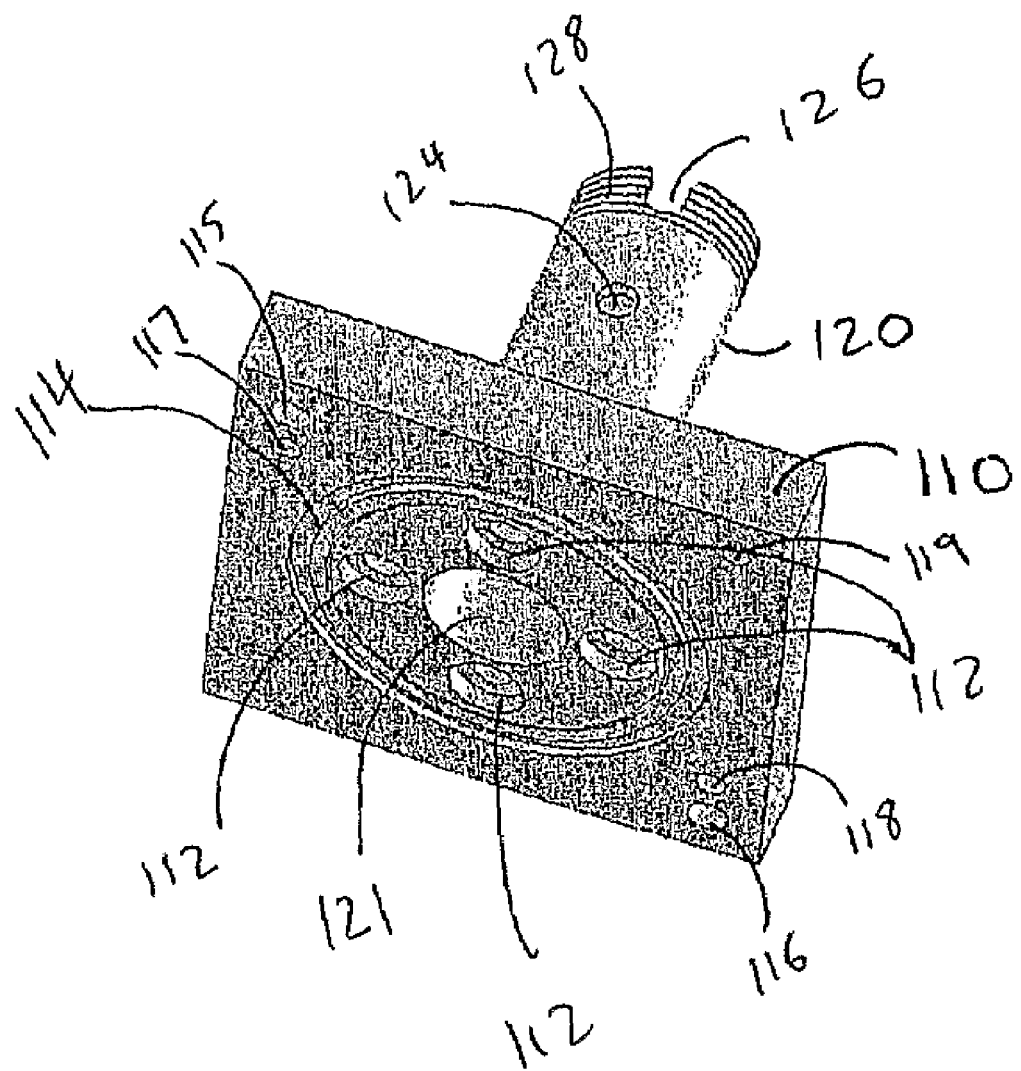
FIG. 2 shows a directional adapter block.

FIG. 2 shows a directional adapter block, comprised of the mounting plate 110 and directional adapter 120. The directional adapter block can be made of two separate pieces (mounting plate 110 and directional adapter 120), or can also be made out of one piece. The mounting plate 110 can be square or any other shape, and is to be mounted onto a spectrometer adjacent to an entrance slit of the spectrometer. The mounting plate 110 comprises an O-ring 114. The mounting plate 110 is secured to the directional adapter 120 by screws inserted through holes 112 (although four are shown in the embodiment, more or less can be used). Of course, any other securing mechanism can be used to secure the mounting plate 110 to the directional adapter 120, and is not limited to the above.

The mounting plate 110 can be directly mounted without the O-ring 114 through mounting holes 112. When tilt adjustment is needed, an O-ring 114 is inserted into a groove and tilt adjustment is accomplished through two cross adjusting screws 115, 116 and a single supporting screw 119. Once the adjustment is done, the position is secured by two lock set screws 117, 118 adjacent to two adjustment screws 115, 116, respectively. The adjustment screws 115, 116 allow for orientation of the plate 110.

The directional adapter 120 is secured by four screws onto the square plate 110 through mounting holes 112. The directional adapter 120 is inserted through direction A into the mounting plate 110, so that screws can be inserted through mounting holes 112 to secure the directional adapter 120 to the mounting plate 110. It has a precision-made open slot 126 for controlling the direction of the lock tube 130. It is threaded on one end for the connector's cap. The directional adapter 120 is threaded on one end. Two clearance holes 122, 124 are for screws that are used to secure the fiber bundle array 140 inside the tube 130 (see description below).

Figure 3:
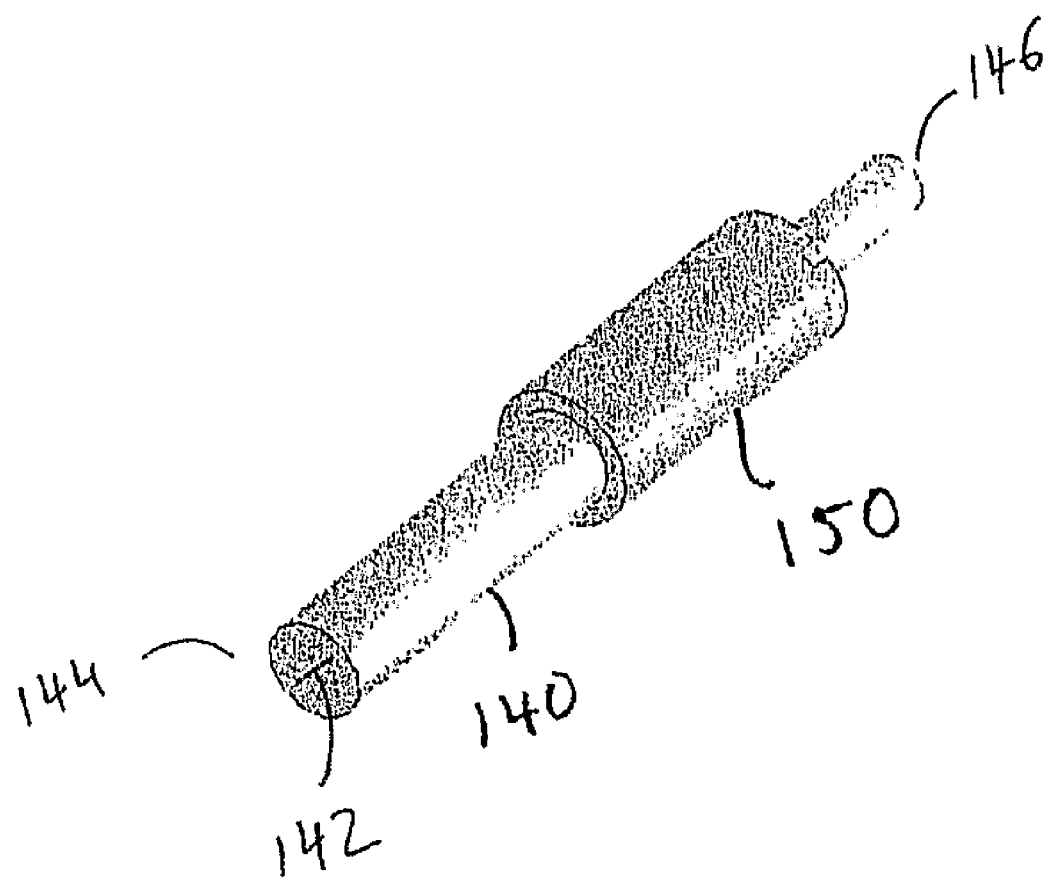
FIG. 3 displays an assembly of a fiber bundle ferrule and a fiber bundle boot.

FIG. 3 shows a fiber bundle 140 that has a linear cross section on one end 144 and a round cross section on the other end 146. The linear end 144 can be a stainless ferrule and the round end can be either SMA or FC or any other type of connector. The fiber bundle array 140 is inserted into a fiber bundle boot 150 and can be secured with appropriate epoxy, or any other means known to one of ordinary skill in the art to secure the fiber bundle array 140 with the fiber bundle boot 150. If there is an open slot on the ferrule 140, the boot 150 is not necessary. The boot 150 is preferable since the two-step feature (two different diameters) of the ferrule-boot assembly brings extra stability to the lock tube 130.

Figure 4A:
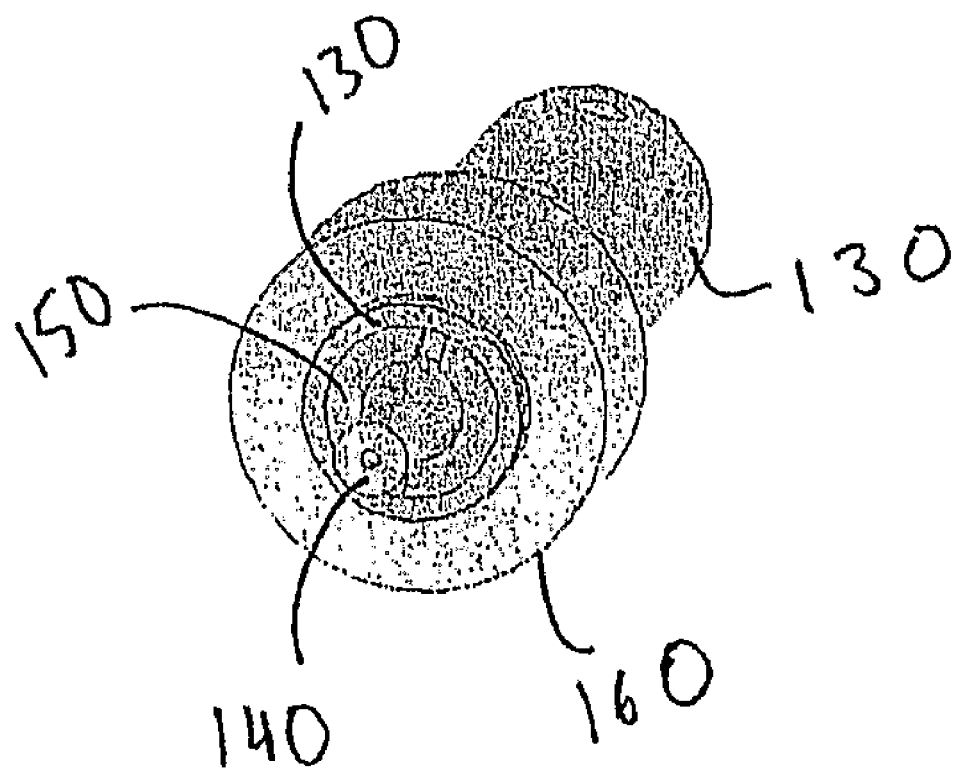
FIGS. 4A and 4B show the assembled fiber bundle connector.
Figure 4B:
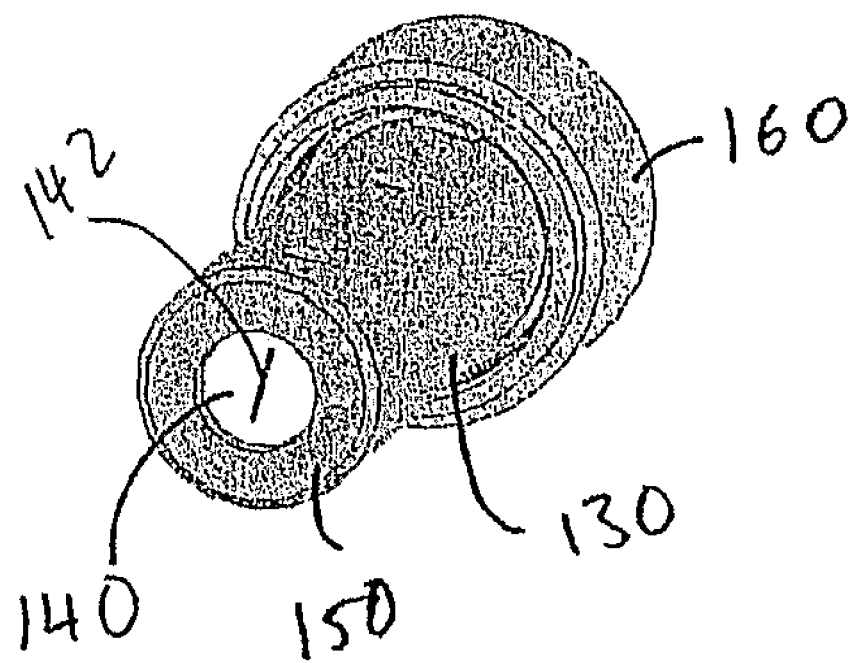

FIGS. 4A and 4B show the lock tube 130 that contains a tube with lock key, a cap 160 and cap retaining ring (not shown in the figure), a fiber bundle 140 and fiber bundle boot 150 with a slot for adjustment.

Now, a method of assembling the coupler of the present invention for coupling a linear fiber array to a spectrometer will be described.

First, the directional adapter 120 is inserted inside the mounting plate 110 through direction A. The directional adapter 120 is secured to the mounting plate 110 via the mounting holes 112 and screws, or by any other means known to secure the plate 110 and adapter 120. The directional adapter 120 is then mounted onto a spectrometer adjacent to the entrance slit. Then, the lock tube 130 is inserted through the directional adapter 120 in direction B, so that the notch 136 is aligned with the slot 126.

Then, the fiber bundle array 140 and fiber bundle boot are attached (or can be attached already) via glue or other means known in the art. The fiber bundle array 140 and boot 150 are inserted into the tube 130. The cap 160 is then tightened and secured to the directional adapter 120 via the external threads 128 on the directional adapter 120. Internal threads (not shown) on the cap attach to the external threads 128 on the directional adapter 120. Then, the bundle-boot assembly (140 and 150) are rotated with a flat drive through the open slot in the boot 150 to align the linear fiber bundle 140 to the spectrometer slit. The fiber boot 150 acts as an alignment means for aligning the linear bundle array 140 with the spectrometer slit.

Once the linear bundle array 140 is aligned with the spectrometer slit, the linear fiber array 140 is tightened via two screws through holes 122, 124 and 132, 134. Holes 122 and 132 are aligned when the lock tube 130 is inserted into the directional adapter 120, and holes 124 and 134 are also aligned. Although two sets of holes are shown (122-132 and 124-134), one set or more than one set may be used, and is not limited to the above description, and other locking means may be used to lock and tighten the fiber bundle array 140 to the tube 130 and directional adapter 120, such as appropriate epoxy or other means as would be obvious to one of ordinary skill in the art. In the embodiment shown, one screw is inserted through holes 122, 132 and one screw is inserted through holes 124, 134 to secure the fiber bundle array 140.

Then, the cap 160 is unscrewed from the external threads 128. A screw is inserted through hole 138 and tightened to secure the fiber bundle boot 150 to the lock tube 130. Of course, other locking means may be used besides a screw, such as epoxy or other means known in the art. The cap 160 is then screwed to the lock tube 130. A cap retaining ring (not shown) is installed on the groove 139 to hold the cap 160 in place.

The present invention provides several advantages that solve the problems with prior art methods. The present invention provides a simple and ease-of-use fiber slit mount for efficiently coupling the linear fiber array to the entrance slit of a spectrometer and also providing a mount for a slitless spectrometer that reduces light loss.

The above description of the present invention is only the preferred embodiment of the invention. Embodiments may include any currently or hereafter-known versions of the elements described herein. Different methods and elements may be used to align the fiber bundle array with the slit of the spectrometer. Different locking means may be used to lock the fiber bundle array and boot, and is not limited to screws and epoxy.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A coupler for coupling a linear fiber array to a spectrometer, comprising:
    a tube, the tube having a notch;
    a linear fiber bundle array inserted through the tube;
    alignment means for aligning the linear fiber bundle array with a slit on the spectrometer;
    locking means for locking the linear fiber bundle array to the tube; and
    a directional adapter, the directional adapter having a slot, wherein a direction of the tube is controlled by aligning the notch of the tube with the slot of the directional adapter.

2. The coupler for coupling a linear fiber array to a spectrometer of claim 1, wherein the alignment means comprises a fiber bundle boot attached to the linear fiber bundle array, the fiber bundle boot also being inserted through the tube.

3. The coupler for coupling a linear fiber array to a spectrometer of claim 1 wherein the tube and linear fiber bundle array are inserted in the directional adapter.

4. The coupler for coupling a linear fiber array to a spectrometer of claim 3, further comprising:
   a mounting plate for securing the directional adapter to the spectrometer.

5. The coupler for coupling a linear fiber array to a spectrometer of claim 1, wherein the locking means comprises one or more screws to lock the linear fiber bundle array inside the tube once the linear fiber bundle array is aligned with the slit on the spectrometer.

6. A coupler for coupling a linear fiber array to a spectrometer comprising:
   a tube;
   a linear fiber bundle array inserted through the tube;
   alignment means for aligning the linear fiber bundle array with a slit on the spectrometer, and
   locking means for locking the linear fiber bundle array to the tube;
   a directional adapter, where the tube and linear fiber bundle array are inserted in the directional adapter; and
   a cap that attaches to the directional adapter for securing the tube and linear fiber bundle array in the directional adapter.

7. A coupler for coupling a linear fiber array to a spectrometer, comprising:
   a tube;
   a linear fiber bundle array inserted through the tube;
   alignment means for aligning the linear fiber bundle array with a slit on the spectrometer; and
   locking means for locking the linear fiber bundle array to the tube,
   wherein the locking means comprises (a) one or more screws to lock the linear fiber bundle array inside the tube once the linear fiber bundle array is aligned with the slit on the spectrometer and (b) one or more screws for locking the alignment means inside the tube once the linear fiber bundle array is aligned with the slit on the spectrometer.

8. A method for coupling a linear fiber array to a spectrometer comprising:
   (a) attaching a fiber bundle boot to a linear fiber bundle array
   (b) inserting the linear fiber bundle array through a tube;
   (c) aligning the linear fiber bundle array with a slit on the spectrometer; and
   (d) locking the linear fiber bundle array to the tube once it is aligned with the slit on the spectrometer.

9. The method for coupling a linear fiber array to a spectrometer of claim 8, further comprising:
   (e) mounting a directional adapter through a mounting plate to be mounted to the spectrometer.

10. The method for coupling a linear fiber array to a spectrometer of claim 9, further comprising:
    (f) inserting the tube through the directional adapter before step (a).

11. The method for coupling a linear fiber array to a spectrometer of claim 10, further comprising:
    (g) securing a cap to the directional adapter after step (a) and before step (b).

12. The method for coupling a linear fiber array to a spectrometer of claim 11, further comprising:
    (h) removing the cap from the directional adapter after step (c).

13. The method for coupling a linear fiber array to a spectrometer of claim 12, further comprising:
    (i) locking the tube to the fiber bundle boot after step (h).

14. The method for coupling a linear fiber array to a spectrometer of claim 13, further comprising:
    (j) securing the cap to a retaining ring on a groove of the tube after step (i).

15. A coupler for coupling a linear fiber array to a spectrometer, comprising:
    a directional adapter inserted through and secured to a center of a mounting plate, the mounting plate secured to a spectrometer;
    a tube inserted through the directional adapter;
    a linear fiber bundle array attached to a fiber bundle boot, the linear fiber bundle array and fiber bundle boot inserted through the tube, the fiber bundle boot allowing for alignment of the linear fiber bundle array with a slit on the spectrometer; and
    locking means for locking the linear fiber bundle array to the tube.

16. The coupler for coupling a linear fiber array to a spectrometer of claim 15, further comprising:
    a second locking means for locking the fiber bundle boot to the tube.

17. A method for coupling a linear fiber array to a spectrometer, the method comprising:
    (a) securing a directional adapter to a mounting plate;
    (b) securing the mounting plate to a spectrometer;
    (c) inserting a tube through the directional adapter;
    (d) attaching a fiber bundle boot to a linear fiber bundle array;
    (e) inserting the linear fiber bundle array through a tube;
    (f) aligning the linear fiber bundle array with a slit on the spectrometer using the fiber bundle boot; and
    (g) locking the linear fiber bundle array to the tube once it is aligned with the slit on the spectrometer.

18. The method for coupling a linear fiber array to a spectrometer of claim 17, further comprising:
    (h) locating the fiber bundle boot to the tube.

\* \* \* \* \*